(12) United States Patent
Skill

(10) Patent No.: US 6,247,487 B1
(45) Date of Patent: Jun. 19, 2001

(54) VALVE ASSEMBLY

(75) Inventor: Thomas S. Skill, St. Clair Shores, MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/428,068

(22) Filed: Oct. 27, 1999

(51) Int. Cl.[7] .................................................. F16K 24/04
(52) U.S. Cl. .......................................... 137/198; 137/199
(58) Field of Search ..................................... 137/198, 199

(56) References Cited

U.S. PATENT DOCUMENTS

| | | | |
|---|---|---|---|
| 2,299,473 | * 10/1942 | Eggleston | 137/198 X |
| 2,544,476 | * 3/1951 | Venning | 137/199 X |
| 2,549,035 | * 4/1951 | White | 137/198 |
| 2,627,868 | * 2/1953 | Runnels | 137/198 |
| 2,729,228 | * 1/1956 | Stevenson | 137/199 |
| 4,813,446 | * 3/1989 | Silverwater et al. | 137/198 |
| 5,107,890 | * 4/1992 | Gute | 137/539 |

FOREIGN PATENT DOCUMENTS

995919 * 6/1965 (GB) .................................. 137/199

* cited by examiner

Primary Examiner—Gerald A. Michalsky
(74) Attorney, Agent, or Firm—Ford Global Tech., Inc

(57) ABSTRACT

A valve assembly 10 for use in a hydraulic circuit. Valve assembly 10 includes a generally hollow cylindrical member 12 and a pair of generally spherical sealing balls or members 14, 16, which are each movably disposed within member 12. Member 12 is operatively and communicatively connected to a first portion 24 and a second portion 26 of a hydraulic circuit. Members 14, 16 cooperate to allow gas to pass from portion 24 to portion 26, while substantially preventing gas from passing from portion 26 to portion 24 and substantially preventing fluid from passing from portion 24 to portion 26.

9 Claims, 5 Drawing Sheets

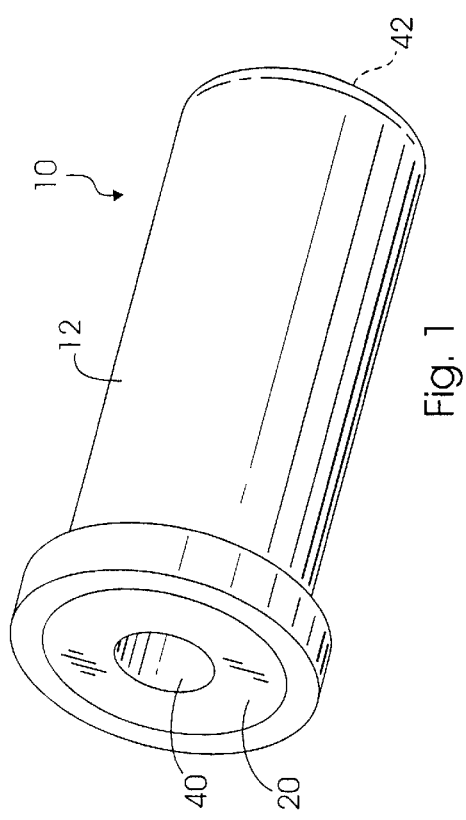
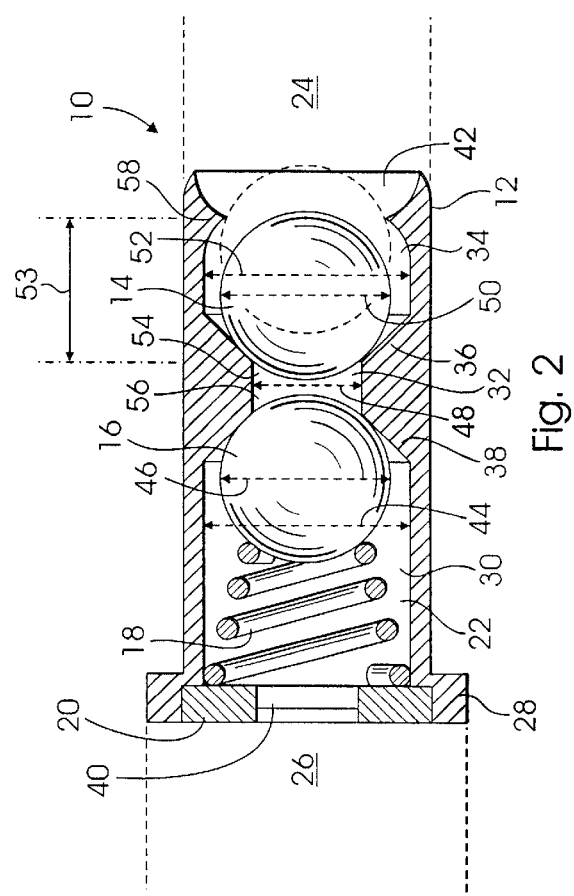

| TOTAL CHARGE TIME (SEC) | TIME SINCE CIRCUIT HAS BEEN "TURNED OFF" | TEMP |
|---|---|---|
| 0.150 | 14 HRS. | 150 |
| 0.150 | 1.8 SEC. | 150 |
| 0.180 | 2 MIN | 150 |
| 0.180 | 1.9 SEC. | 150 |
| 0.190 | 1.9 SEC. | 150 |
| 0.180 | 2.1 SEC. | 150 |
| 0.170 | 1.6 SEC. | 150 |
| 0.170 | 2.2 SEC. | 150 |
| 0.170 | 1.6 SEC. | 150 |
| 0.170 | 1.5 SEC. | 150 |
| 0.180 | 2.0 SEC. | 150 |
| 0.150 | 1.6 SEC. | 150 |
| 0.170 | 1.5 SEC. | 150 |
| MEAN 0.170 | SEC. | |
| STD. DEV. 0.013 | | |

Fig. 6A

| TOTAL CHARGE TIME (SEC) | TIME SINCE CIRCUIT HAS BEEN "TURNED OFF" | TEMP |
|---|---|---|
| 0.780 | 2 MIN. | 150 |
| 0.430 | 4.9 SEC. | 150 |
| 0.350 | 4.2 SEC. | 150 |
| 0.400 | 2.5 SEC. | 150 |
| 0.840 | 30 SEC. | 150 |
| 0.470 | 6.7 SEC. | 150 |
| MEAN 0.545 | SEC. | |
| STD. DEV. 0.210 | | |

(PRIOR ART)
Fig. 6B

VALVE ASSEMBLY

FIELD OF THE INVENTION

This invention relates to a valve assembly and more particularly, to a valve assembly which allows air or gas to be discharged from a hydraulic circuit and/or from a portion of a hydraulic circuit and which substantially prevents the discharged air or gas from passing back into and/or re-entering the circuit and/or the portion of the hydraulic circuit from which the air or gas was previously expelled.

BACKGROUND OF THE INVENTION

Valve assemblies are used within vehicles and other apparatuses and assemblies to control the flow of fluids, gasses, and/or other materials between various interconnected and/or communicating portions or chambers which are respectively contained and/or resident within these vehicles, apparatuses, and assemblies.

One type of valve assembly, known as an "air bleed" check valve assembly, is typically disposed within a hydraulic circuit (e.g. within the hydraulic circuit of a vehicle clutch assembly), and operatively allows air or gas to pass from a portion of the hydraulic circuit and through the valve assembly, while substantially and concomitantly preventing hydraulic fluid from escaping and/or exiting from the hydraulic circuit and from passing through the valve assembly.

This type of valve assembly typically includes a "check ball" or member which is contained within a channel or slot. The channel includes an aperture or passage through which the gas or air, escaping and/or exiting from a portion of the hydraulic circuit, may pass. The aperture is substantially surrounded by a valve seat. The ball member is movable between a first position in which the ball member resides upon the valve seat, and a second position in which the ball member does not reside on the seat (e.g., in which the ball member is remotely positioned from the ball seat), thereby allowing air or gas to pass through the aperture, to be received within a certain portion of the valve assembly, and to be expelled from the valve assembly. The selective movement of the ball member allows gas or air to be expelled and/or discharged from a portion of the hydraulic circuit and to be communicatively transferred and/or moved through the valve assembly, while substantially preventing hydraulic fluid from being expelled from the circuit. Particularly, the flow of the relatively high density hydraulic fluid into the valve assembly causes the ball member to move from the second position to the first position, thereby covering the aperture and preventing the hydraulic fluid from passing through the aperture and through the valve assembly.

While this prior type of valve assembly is relatively effective to operatively expel/discharge and/or communicatively transfer gas or air from and/or by and between portions of a hydraulic circuit, it suffers from some drawbacks which adversely effect its performance.

For example and without limitation, when air or gas is passed through this prior type of valve assembly, the pressure on the other side or portion of the valve assembly (the side or portion which receives the "passed" or discharged air or gas) is often increased. This increase in pressure typically results in and/or causes air to flow or "bleed" back through the valve assembly and into the portion of the hydraulic circuit from which the air or gas had been expelled. This "back flow" or "drain back" of air or gas into the hydraulic circuit causes the circuit to have inconsistent system operating and response characteristics and to be "unstable". For example and without limitation, the amount of time required to achieve and maintain a certain pressure within the circuit varies, is not readily ascertainable, and is undesirably increased due to this back flow of air or gas into the circuit.

There is therefore a need for a new and improved valve assembly for use in combination with a hydraulic circuit or device; which allows gas or air to exit from the hydraulic circuit and to pass through the valve assembly while substantially preventing hydraulic fluid from exiting the hydraulic circuit; which substantially prevents the previously expelled air and/or gas from flowing back into the portion of the hydraulic circuit from which the air or gas has been expelled; and which substantially improves the overall stability and operating characteristics of the hydraulic circuit.

SUMMARY OF THE INVENTION

It is a first object of the invention to provide a valve assembly which overcomes some or all of the previously delineated drawbacks of prior valve assemblies.

It is a second object of the invention to provide a valve assembly for use within a hydraulic circuit and which allows gas and/or air to be selectively discharged and/or to exit from the hydraulic circuit and to pass through the valve assembly, while substantially preventing hydraulic fluid from exiting from the hydraulic circuit and passing through the valve assembly, and which substantially and concomitantly prevents the previously discharged gas and/or air from flowing back into the hydraulic circuit and/or into the portion of the hydraulic circuit from which the air or gas was discharged.

It is a third object of the present invention to provide a valve assembly for use within a hydraulic circuit and which allows the circuit to substantially and consistently achieve a certain pressure within a relatively short period of time.

According to a first aspect of the present invention, a valve assembly is provided for use in combination with a circuit having a first portion containing a fluid and a gas and a second portion. The valve assembly includes a first member having a channel which is communicatively coupled to the first portion of the circuit and to the second portion of the circuit. A first sealing element is movably disposed within the channel and is effective to allow the gas to pass from the first portion of the circuit to the second portion of the circuit, while substantially preventing the fluid from passing from the first portion of the circuit to the second portion of the circuit. A second sealing element is movably disposed within the channel and is effective to allow the gas to pass from the first portion of the circuit to the second portion of the circuit, while substantially preventing the gas from passing from the second portion of the circuit to the first portion of the circuit.

According to a second aspect of the present invention, a method for controlling the flow of gas and hydraulic fluid between a first portion and a second portion of a hydraulic circuit is provided. The method includes the steps of allowing the gas to flow from the first portion to the second portion; preventing hydraulic fluid from flowing from the first portion to the second portion; and preventing the gas from flowing from the second portion to the first portion.

These and other objects, aspects, features, and advantages of the present invention will become apparent from a consideration of the following specification and the attached drawings.

BRIEF DESCRIPTION OF THE DRAWINGS

FIG. 1 is a perspective view of a valve assembly which is made in accordance with the teachings of the preferred embodiment of the invention;

FIG. 2 is a sectional side view of the valve assembly which is shown in FIG. 1;

FIG. 6A is a table illustrating the "charge time" of a hydraulic circuit employing the valve assembly of the present invention;

FIG. 6B is a table illustrating the "charge time" of a hydraulic circuit employing a conventional or prior check valve assembly;

DETAILED DESCRIPTION OF THE PREFERRED EMBODIMENT OF THE INVENTION

Figure 5:
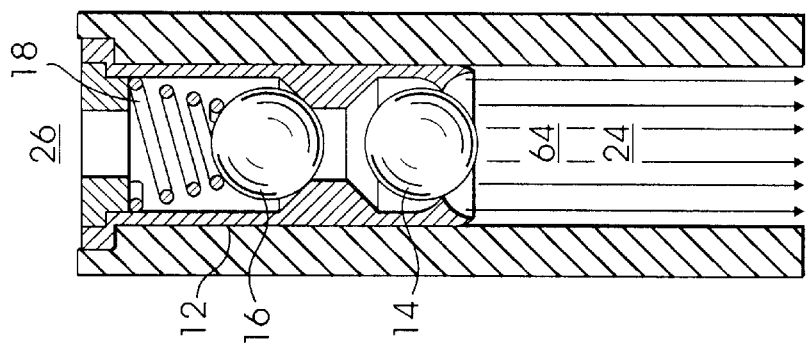
FIG. 5 is a sectional view of the hydraulic circuit which is shown in FIG. 3 after the circuit has been substantially depressurized.

Referring now to FIGS. 1 and 2, there is shown a valve assembly 10 which is made in accordance with the teachings of the preferred embodiment of the invention. As shown, valve assembly 10 includes a generally cylindrical and hollow member or housing 12 having an integrally formed flange portion 28 and an interior channel 22 which is longitudinally coextensive to housing 12. Assembly 10 further includes a pair of generally spherical sealing elements, balls or members 14, 16, which are each independently and movably disposed within the channel 22. Assembly 10 further includes a generally circular member 20, which is fixedly and conventionally coupled within end 28 of member 12, and a spring 18 which is operatively coupled to member 20, which is movably contained within channel 22, and which is received by and is conventionally and operatively coupled to element or member 16.

It should be appreciated by one of ordinary skill in the art that valve assembly 10 may be selectively used to replace a conventional check valve assembly/device within a hydraulic circuit, such as a check valve assembly which is used within a conventional vehicle clutch assembly, and as described more fully and completely below, assembly 10 is designed and/or is adapted to be positioned and/or to be operatively and communicatively connected to a first chamber or portion 24 and a second chamber or portion 26 of a conventional and/or typical hydraulic circuit or device. In one non-limiting embodiment portions 24, 26 may be included within a single hydraulic circuit. In another non-limiting embodiment, portion 26 does not reside within and is not operatively "contained within" and/or does not form a part of the hydraulic circuit which includes portion 24. It should be further appreciated that elements and/or members 14, 16 may be of virtually any shape and that this invention is not limited to the use of spherically shaped elements 14, 16.

Member 20 includes a centrally disposed aperture 40 which communicatively couples portion 26 to channel 22. Channel 22 further integrally terminates within and/or integrally forms aperture 42 which communicatively couples channel 22 to portion 24.

Member 12 is preferably manufactured from a durable material such as without limitation steel, plastic, and/or a composite material. As best shown in FIGS. 2–5, element 16 movably resides within a first section or portion 30 of channel 22, while element 14 movably resides within a second section or portion 34 of channel 22. Portions 30 and 34 integrally terminate within a generally constricted or tapered middle or "throat" section or portion 32. In the preferred embodiment of the invention, portion 30 has an inner diameter 44 which is larger than diameter 46 of member 16; portion 32 has an inner diameter 48 which is smaller than the diameter 46 of member 16 and is smaller than the diameter 50 of member 14; and portion 34 has a diameter 52 which is larger than diameter 50. "Valve seats" 36, 38 are respectively and integrally formed at and/or within the respective regions 54, 56 of channel 22 where portions 34, 30 terminate within portion 32.

Diameters 50, 52 and length 53 are respectively "fixed" or "sized", in a conventional manner, in order to substantially allow gas which enters portion 34 to dislodge element 14 from valve seat 36, while causing hydraulic fluid which enters into portion 34 to force element 14 onto seat 36. In one non-limiting embodiment diameters 46 and 52 are substantially identical. It should be appreciated that diameters 44–50 may be adjusted in a conventional manner to conform to the specific application or circuit in which assembly 10 is to be used. Portion 34 includes an annular ridge 58 which operatively retains member 14 within channel 22.

Spring 18 is preferably a conventional spring and pressingly forces and/or biases element or member 16 against valve seat 38, thereby operatively and selectively sealing portion 32 and substantially preventing communication between portion 34 and 32. In one non-limiting embodiment, spring 18 is generally conical in shape.

In operation, valve assembly 10 is selectively and operatively disposed or secured within a hydraulic circuit or device having various portions or chambers through which air, gas or vapor are desired to be selectively transferred or expelled, such as within a conventional vehicle clutch assembly. By way of example and without limitation, as shown best in FIGS. 3 through 5, assembly 10 may be operatively secured within a hydraulic circuit 60 containing a certain amount of air or gas 62 and a certain amount of hydraulic fluid 64. Particularly, aperture 40 is operatively and communicatively coupled to a gas discharge chamber or portion 26, which may form a part of the hydraulic circuit 60, and aperture 42 is operatively and communicatively coupled to a portion 24 of circuit 60 containing an amount of hydraulic fluid 64 and gas 62.

In such a manner, it should be appreciated that assembly 10 may be used to selectively replace a conventional air-bleed or check valve within a typical and/or existing hydraulic circuit, such as circuit 60 (e.g., a hydraulic circuit which is used within a clutch assembly). Particularly, assembly 10 is operatively connected, as is more fully delineated below, within circuit 60 in a manner which selectively permits "communication" or the passage of gas or air between portions 24 and 26 to occur through assembly 10.

Figure 3:
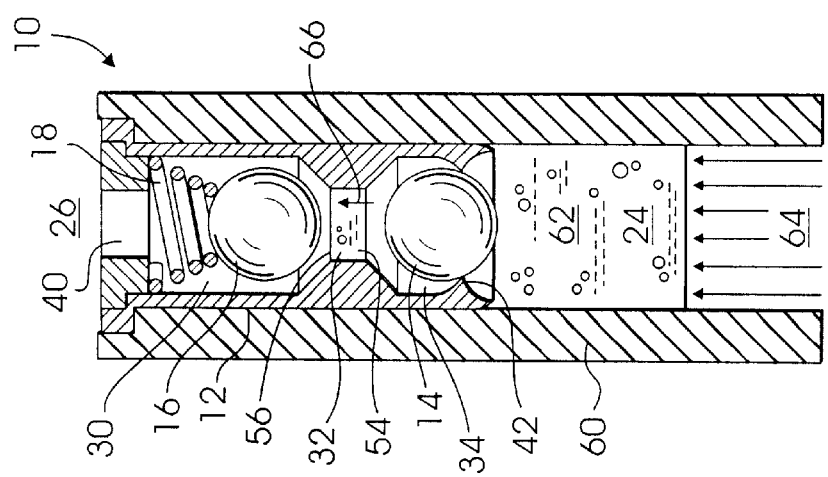
FIG. 3 is a sectional view of the valve assembly which is shown in FIG. 1 and which is deployed within a hydraulic circuit having a certain amount of air or gas which is to be expelled from the circuit.

As hydraulic circuit 60 is pressurized, the gas 62 within circuit 60 is forced through aperture 42 and into channel portion 34 of assembly 10. As best shown in FIG. 3, the pressure of gas 62 and its relatively low density causes member or element 14 to move within portion 34 and to be dislodged from valve seat 36, thereby "uncovering" region or portion 54 of channel 22 and allowing gas 62 to pass into portion 32. The pressure of gas 62 imparts a force upon the member or element 16, in the direction of arrow 66, which causes the member or element 16 to be dislodged from valve seat 38, thereby compressing spring member 18, uncovering channel region or portion 56, and allowing the gas 62 to enter channel portion 34 and to be expelled through aperture 40 and into portion 26.

Figure 4:
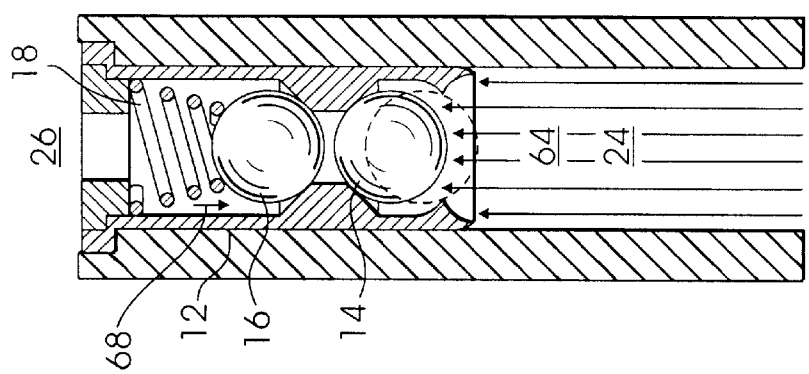
FIG. 4 is a sectional view of the hydraulic circuit which is shown in FIG. 3 after the certain amount of air or gas has been expelled from the circuit.

As best shown in FIG. 4, once substantially all of the gas 62 has been expelled from circuit 60, pressurized hydraulic fluid 64 enters assembly 10 through aperture 42. The pressure and relatively high density of hydraulic fluid 64 forces ball 14 to move in the direction of arrow 66 and onto seat 36, thereby retaining the member or element 14 on the valve seat 36 and covering, "closing", and/or sealing the channel portion 54 from portion 24, thereby substantially preventing hydraulic fluid 64 from passing through the channel portion 54. Concomitantly, spring 18 biasingly forces the member or element 16 in the direction of arrow 68 and onto the valve seat 38, thereby retaining ball 16 on the valve seat 38 and covering, "closing", and/or sealing the channel portion 56. In this manner, gas 62 is substantially prevented from flowing or escaping back into portion 24 of circuit 60.

As best shown in FIG. 5, when the circuit 60 is depressurized (when substantially all the air/gas within portion 24 has been expelled), spring 18 continues to retain the member or element 16 on the valve seat 38, thereby continuing to substantially prevent any air or gas from reentering portion 24. In this manner, it should be appreciated that hydraulic fluid 64 acts as a "solid link" between a controlled pressure input into circuit 60 and the desired load or demand to be provided by circuit 60. As a result, circuit 60 provides a relatively faster and more consistent response time than circuits employing prior valve assemblies.

For example and without limitation, chart 70 shown in FIG. 6A illustrates the total "charge" time required for a typical and/or conventional hydraulic clutch circuit which employs the valve assembly 10 and which is used within a vehicle. Particularly, column 72 illustrates the "charge time" of the circuit in seconds (e.g., the time required for the circuit to achieve a certain pressure or load), column 74 illustrates the corresponding amount of time that the circuit has been depressurized or "turned off" prior to charging, and column 76 illustrates the approximate temperature of the circuit in degrees Fahrenheit. Chart 80 of FIG. 6B illustrates the total "charge time" required for the same hydraulic clutch circuit for which data was acquired and illustrated in FIG. 6A, but which employs a conventional or prior type of check valve assembly. Particularly, column 82 illustrates the charge time of the circuit in seconds, column 84 illustrates the corresponding amount of time that the circuit has been depressurized or "turned off" prior to charging (i.e., the "off time" of the circuit), and column 86 illustrates the approximate temperature of the circuit in degrees Fahrenheit.

As shown, the average or "mean" charge time for the hydraulic circuit employing valve assembly 10 is significantly less than the average or "mean" charge time for the same circuit employing a conventional check valve. Moreover, the charge times, for the circuit employing assembly 10, are more consistent, ranging from 0.15 seconds for an "off time" of 1.8 seconds to 0.19 seconds for an "off time" of 1.9 seconds. The circuit, when employing the conventional or prior type of check valve, had values which ranged from 0.35 seconds for an "off time" of 4.2 seconds to 0.84 seconds for an off time of 30 seconds.

Figure 7A:
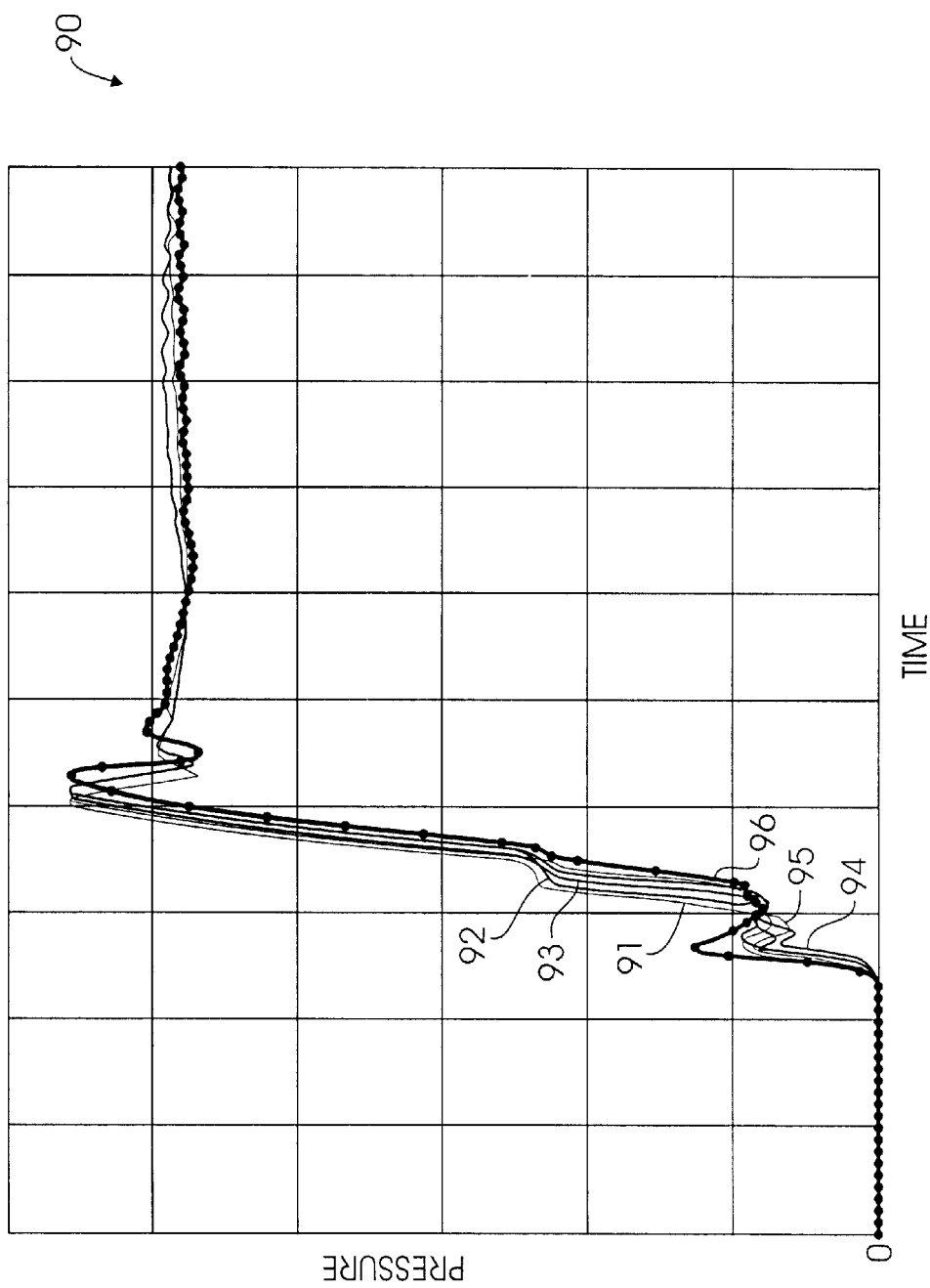
FIG. 7A is a graph illustrating the pressure response characteristics of a hydraulic circuit employing the valve assembly of the present invention.
Figure 7B:
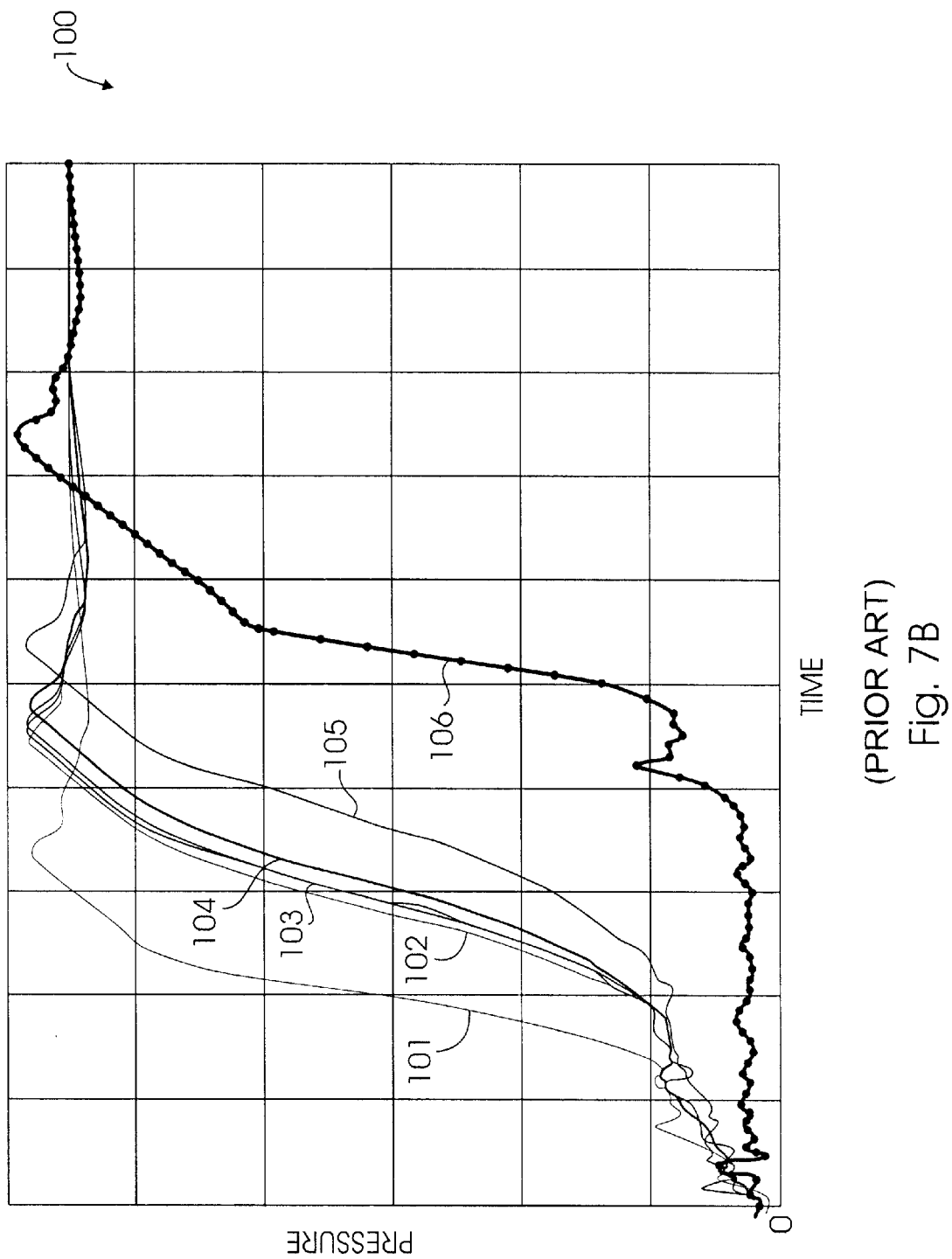
FIG. 7B is a graph illustrating the pressure response characteristics of a hydraulic circuit employing a conventional or prior check valve assembly.

Graph 90 of FIG. 7A illustrates the pressure response and time relationship for the hydraulic clutch circuit which employs valve assembly 10 and which was used to obtain the data found in FIG. 6A. Graph 100 of FIG. 7B illustrates the pressure and time relationship for the same hydraulic clutch circuit (as used to obtain data shown in FIG. 7A) employing a conventional or prior type of check valve. Particularly, curves 91–96 of graph 90, represent the pressure response achieved by the hydraulic clutch circuit employing assembly 10 and corresponding to several different "off time" values, and curves 101–106 of graph 100 represent the pressure response achieved by the hydraulic clutch circuit employing a conventional or prior check valve for several "off time" values, each of which respectively and substantially correspond to a unique one of the "off time" values used to generate the curves 91–96. As indicated by graphs 90 and 100, valve assembly 10 provides a significantly more consistent pressure response than a conventional or prior check valve (e.g., the curves 91–96 are substantially and relatively identical while the shapes of the curves 101–106 are not). It should be appreciated that the relative shapes of curves 91–96 and 101–106 are independent of the units in which "pressure" and "time" are measured and that the same units of measurement are used to create each of the curves 91–106.

It is understood that the invention is not limited by the exact construction or method illustrated and described above but that various changes and/or modifications may be made without departing from the spirit and/or the scope of this invention.

What is claimed is:

1. A valve assembly for use in combination with a hydraulic circuit having a first portion, a second portion, an amount of gas, and an amount of hydraulic fluid, said valve assembly comprising:

a housing having a channel which is selectively and communicatively connected to said first portion and to said second portion and which includes a first side having a first diameter and a second side which are separated by a constricted region having first and second valve seats;

a first ball which is disposed within said first side of said channel and which is movable from a first position in which said first ball resides within said first valve seat, thereby preventing said first portion from communicating with said second portion, and a second position in which said first ball is removed from said first valve seat, and in which said first portion and said second portion are communicatively coupled, said first ball having a second diameter which is smaller than said first diameter and which is effective to cause said first ball to be movable from said first position to said second position in response to said gas entering said channel and to be movable from said second position to said first position in response to said hydraulic fluid entering said channel and engaging said first ball, thereby substantially preventing fluid from being communicated from said first portion to said second portion;

a second ball which is disposed within said second side of said channel and which is movable between a third position in which said second ball resides upon said second valve seat, thereby preventing said first portion from communicating with said second portion, and a fourth position in which said first portion and said second portion are communicatively coupled, said second ball being movable from said fourth position to said third position, after substantially all of said gas has been exhausted from said first portion; and a spring member which is coupled to said housing and to said second ball, and which is effective to cause said second ball to move from said fourth position to said third position, after substantially all of said gas has been exhausted from said first portion.

2. The valve assembly of claim 1 wherein said housing is generally cylindrical in shape.

3. The valve assembly of claim 1 wherein said spring is generally conical in shape.

4. The valve assembly of claim 1 wherein said first ball and said second ball are substantially identical in size.

5. The valve assembly of claim 1 wherein said housing comprises a ridge portion which retains said first ball within said channel.

6. A valve assembly for use in combination with a circuit having a first portion containing a fluid and a gas and a second portion, said valve assembly comprising:

a first member including a channel having a first side of a first diameter and a first valve seat and which is communicatively coupled to said first portion of said circuit and a second side having a second valve seat and which is communicatively coupled to said second portion of said circuit;

a first sealing ball which is movably disposed within first side of said channel and which has a second diameter, which cooperates with said first diameter, effective to cause said first sealing ball element to allow said gas to pass from said first portion of said circuit channel to said second portion of said circuit, but to move said first sealing ball against said valve seat when hydraulic fluid enters said first side of said channel and engages said first sealing ball element, thereby substantially preventing said hydraulic fluid from passing from said first portion of said circuit to said second portion of said circuit;

a second sealing ball which is movably disposed within said second side of said channel and which is effective to allow said gas to pass from said first portion of said circuit to said second portion of said circuit, while substantially preventing said gas from passing from said second portion of said circuit to said first portion of said circuit;

a spring member which is coupled to said housing and to said second ball, and which biases said second ball in said second valve seat; and a ridge which is formed within said first side of said channel and which is effective to retain said first ball within said channel when said first ball is in said second position.

7. The valve assembly of claim 6 wherein said channel includes a constricted portion and wherein first and second valve seats are integrally formed with said housing on opposing sides of said constricted portion.

8. The valve assembly of claim 6 wherein said ridge comprises an annular ridge.

9. The valve assembly of claim 8 wherein said annular ridge is integrally formed with said housing.

* * * * *